United States Patent
Brooks

(10) Patent No.: US 9,739,025 B2
(45) Date of Patent: *Aug. 22, 2017

(54) ROTARY AUGER SUPPORT STAND

(71) Applicant: Kevin Brooks, Leitchfield, KY (US)

(72) Inventor: Kevin Brooks, Leitchfield, KY (US)

(73) Assignee: Decoy Stake Solutions, LLC, Leitchfield, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/998,681

(22) Filed: Feb. 5, 2016

(65) Prior Publication Data

US 2016/0281316 A1    Sep. 29, 2016

Related U.S. Application Data

(63) Continuation-in-part of application No. 14/121,468, filed on Sep. 9, 2014, now Pat. No. 9,347,733, and a continuation of application No. 14/121,469, filed on Sep. 9, 2014, now Pat. No. 9,316,016, and a continuation of application No. 13/998,981, filed on Dec. 30, 2013, now abandoned.

(60) Provisional application No. 62/176,002, filed on Feb. 5, 2015, provisional application No. 62/231,357, filed on Jul. 3, 2015, provisional application No. 62/386,729, filed on Dec. 10, 2015, provisional application No. 62/386,730, filed on Dec. 10, 2015.

(51) Int. Cl.
A45F 3/44 (2006.01)
E02D 5/80 (2006.01)
A01M 31/00 (2006.01)
F41B 5/14 (2006.01)

(52) U.S. Cl.
CPC .............. *E02D 5/801* (2013.01); *A01M 31/00* (2013.01); *F41B 5/1453* (2013.01)

(58) Field of Classification Search
CPC ....... A01K 27/004; E02D 5/801; A01M 31/00
See application file for complete search history.

(56) References Cited

U.S. PATENT DOCUMENTS

| | | | |
|---|---|---|---|
| 32,226 A | 4/1861 | Dotson | |
| 168,890 A | 10/1875 | Field | |
| 345,877 A | 7/1886 | Brainard | |
| 907,799 A | 12/1908 | Hawley | |
| 1,562,343 A | 11/1925 | Post | |
| 2,269,996 A * | 1/1942 | Webster | H01B 17/145 174/139 |
| 2,447,444 A | 8/1948 | Waite | |
| 2,563,159 A | 8/1951 | Louis | |

(Continued)

*Primary Examiner* — Amy Sterling
(74) *Attorney, Agent, or Firm* — Carrithers Law Office, PLLC

(57) ABSTRACT

A rotary auger support stand for mounting and removably holding a articles or devices upright on the ground. The stand includes an upright rod with a helical coil or flights forming an auger base having a point at the lower distal end to be fixedly and removably screwed into the ground to support the stand in an upright position. The top end of the rod forming the stand body defines an S-shaped loop configured, sized and shaped and disposed at a selected angle to support an article thereon. The top adapter is capable of supporting a decorative element, sign, target, or other element. An S-shaped handle is formed integrally within the support shaft longitudinal member extending from the auger.

33 Claims, 7 Drawing Sheets

(56) References Cited

U.S. PATENT DOCUMENTS

| | | | |
|---|---|---|---|
| 2,901,789 | A | 9/1959 | Frank |
| 3,688,454 | A | 9/1972 | Wolfcarius |
| 4,928,418 | A | 5/1990 | Stelly |
| 5,098,057 | A | 3/1992 | Gran |
| 6,116,760 | A | 9/2000 | Cox |
| 6,412,236 | B1 | 7/2002 | Johnson |
| 6,481,147 | B2 | 11/2002 | Lindaman |
| 6,487,977 | B1 | 12/2002 | Willaims |
| 6,698,132 | B1 | 3/2004 | Brint |
| 6,810,630 | B2 | 11/2004 | Chizmas |
| 6,901,693 | B1 | 6/2005 | Crowe |
| D550,071 | S | 9/2007 | Powell |
| D554,980 | S | 11/2007 | Mihelis |
| 7,493,873 | B2 | 2/2009 | Petersen |
| 8,230,638 | B1 | 7/2012 | Dunaway |
| 2005/0268522 | A1 | 12/2005 | Foster |

\* cited by examiner

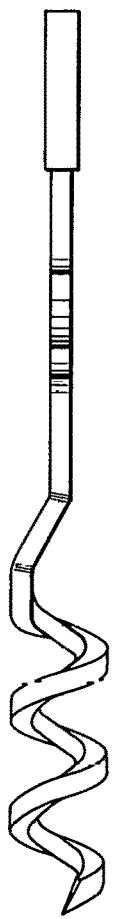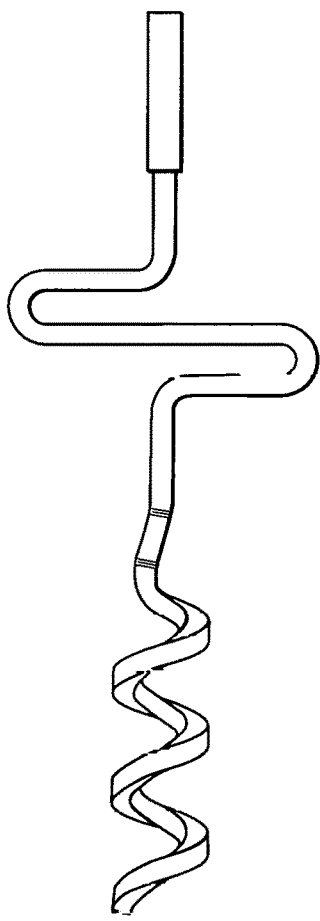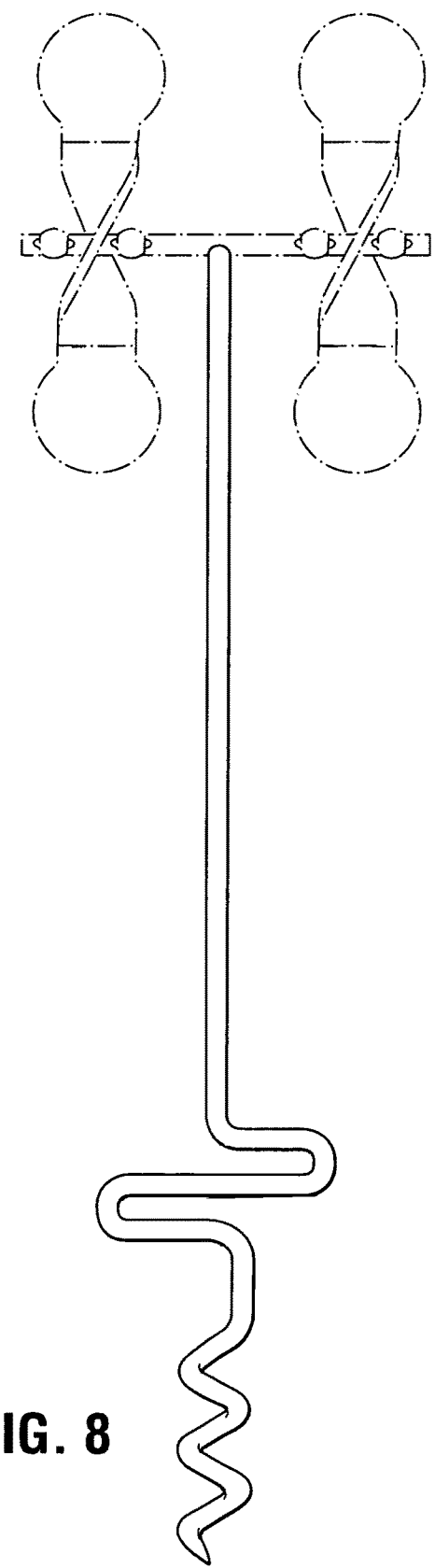
FIG. 6    FIG. 7
FIG. 8

ROTARY AUGER SUPPORT STAND

CROSS REFERENCE TO RELATED APPLICATIONS

This application is a continuation in part of U.S. application Ser. No. 14/121,468 filed on Sep. 9, 2014 and U.S. application Ser. No. 14/124,469 filed on Sep. 9, 2014 U.S. application Ser. No. 13/998,981 filed on Dec. 30, 2013 and claims priority from U.S. Provisional Application Ser. No. 62/176,002 filed on Feb. 5, 2015 and U.S. Provisional Application Ser. No. 62/231,357 filed on Jul. 3, 2015 and U.S. Provisional Application Ser. No. 62/386,729 filed on Dec. 20, 2015 and U.S. Provisional Application Ser. No. 62/386,730 filed on Dec. 10, 2015 all of which are incorporated herein in its entirety.

TECHNICAL FIELD

The present invention relates to a stand having an integral handle and auger for supporting an object on an adapter in an upright position in the ground.

BACKGROUND OF THE INVENTION

The portable and reusable auger tie down holder of the present invention includes an integrated loop handle which can be installed in the ground with no tools by twisting and rotating the handle screwing the auger base into the ground providing a tie down support to hold the tie down about 8 inches from the ground for quick and easy accessibility.

SUMMARY OF THE INVENTION

A rotary auger support stand for mounting and removably holding a articles or devices upright on the ground. The stand includes an upright rod with a helical coil or flights forming an auger base having a point at the lower distal end to be fixedly and removably screwed into the ground to support the stand in an upright position. The top end of the rod forming the stand body defines an S-shaped loop configured, sized and shaped and disposed at a selected angle to support a the arm of a tie down holding the tie down in a substantially vertical position above the ground. The integral loop which supports the tie down forms a handle for the purpose of rotating the auger into the ground. The auger includes a vertical shaft having a cork screw or a helical coil formed in the bottom end, a top end capable of supporting a decorative element, sign, target, or other element, and having an S-shaped handle formed integrally within the support shaft or longitudinal member extending from the auger with an vertically disposed "S" shaped loop formed in the center of the stand for enabling the screwing of the cork screw into the ground for vertical stabilization of the stake. The bottom helical coil ends with a sharp tip for easing the installation into the ground.

A rotary auger tie down mounting stand for removably holding a tie down upright on the ground. The stand includes an upright rod with a helical coil or flights forming an auger having a point at the lower distal end to be fixedly and removably screwed into the ground to support the stand in an upright position. The top end of the rod forming the stand body defines an S-shaped loop configured, sized and shaped and disposed at a selected angle to support a the arm of a tie down holding the tie down in a substantially vertical position above the ground. The integral loop which supports the is tie down forms a handle for the purpose of rotating the auger into the ground.

It is an object of this invention to provide a portable and reusable tie down holder stand which includes a helical coil at one end which can be screwed into the ground.

It is an object of this invention to provide a tie down support stand which includes an integral crank handle for the purpose of screwing the stand into the ground.

It is an object of this invention to provide an integral crank handle for the purpose of screwing the stand into the ground wherein the crank handle services to support the arm of a tie down substantially vertically with respect to the ground.

It is another object of the present invention to provide a tie down holder wherein the integral handle serves to support the tie down in a rested position.

It is another object of the present invention to provide a integrated handle with sound dampening sleeve composed of a fabric, polymer, rubber, or elastomer to cover a selected portion of the tie down rest.

It is another object of the present invention to provide an integral handle tie down rest at an upper end of a shaft extending upwardly from the spiral auger wherein the handle tie down rest can be bent at a selected angle to hold the tie down in a selected position with respect to the surface of the ground.

The present invention is for a rotary auger tie down stand comprising or consisting of an elongated vertical rod having a helical spiral coil extending downward therefrom a selected distance for penetration into the ground, and at least one "S" shaped loop extending from a top portion of said rod comprising at least two looped sections spaced apart from and in vertical alignment with one another for receiving an arm of a tie down.

More particularly, the rotary auger tie down has a medial portion comprising an elongated rod and a bottom portion comprising a helical spiral coil having a point extending downward from the elongated rod for a selected distance for penetration into the ground. The top portion defines a bow arm rest support comprising at least one curved "S" shaped loop portion extending upwardly from a top distal end of the elongated rod, the "S" shaped loop portion including a first straight section extending outwardly from the elongated rod at a selected angle from the top distal end of the elongated rod. A first curved end section extends from a distal end of the first straight section returning 180 degrees extending inwardly toward the elongated rod forming a second straight section spaced apart, parallel, and in alignment with the first straight section extending past the elongated rod. A second opposing curved end section returns 180 degrees extending inwardly forming a third straight section extending from the second opposing curved end section spaced apart, parallel, and in alignment with the first straight section and the second straight section.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein:

FIG. 6 is a perspective view of a rotary auger support stand having a rectangular, or square tubular adapter extending from the top for cooperative engagement with a corresponding tube or bar stock shaft of an article to be supported thereon including a spiral auger portion having a square cross-sectional area;

FIG. 7 is a front view of the rotary auger support stand shown in FIG. 6;

FIG. 8 is a front view showing an rotary auger support stand supporting a target shown in broken lines;

DESCRIPTION OF THE PREFERRED EMBODIMENTS

Rotary Tie Down

The rotary auger support stand includes a bottom section extending from a bottom distal end of the medial section, the bottom section comprising a helical spiral coil extending downward therefrom a selected distance including a tapered point for penetration into the ground. A medial section extends upward from the bottom section having a generally vertical rod. A handle section extending from the medial section comprising a curved rod forming at least one "S" shaped loop comprising a first horizontal segment extending outwardly from the medial section at a generally 90 degree angle a selected first length and having a proximate end portion curving upward forming a first 180 degree curved loop extending upward and over the first horizontal segment and past the medical section a selected second length defining a second horizontal section spaced apart from and in alignment with the first horizontal section, the second horizontal segment forming a second 180 degree curved loop extending upward and over a portion of the second horizontal segment forming a third horizontal segment extending to the medial section spaced apart and in alignment with the second horizontal segment, the third horizontal segment forming a generally 90 degree angle extending upward forming a top section comprising a rod in vertical alignment with the medial section for supporting an article thereon.

Auger

As shown in the figures, the helical auger is shown as a curve in three dimensional space having a tangent line and any point which makes a constant angle with a fixed line called the axis. The pitch of a helix is the width of one complete helix turn, measured parallel to the axis of the helix. A circular helix has a constant radius and constant band curvature and constant torsion.

A preferred embodiment of the helical auger includes a top vertical portion for mounting an adapter or article to be supported thereon, a neck, a main body portion and a tip portion including a distal end forming a wedge or pointed segment.

The rotary auger support includes an above ground upright rod or shaft top portion having an offset neck connecting to a main body portion comprising a plurality of helixes. A distal end segment comprises a half helix ending in a sharp point.

Figure 17:
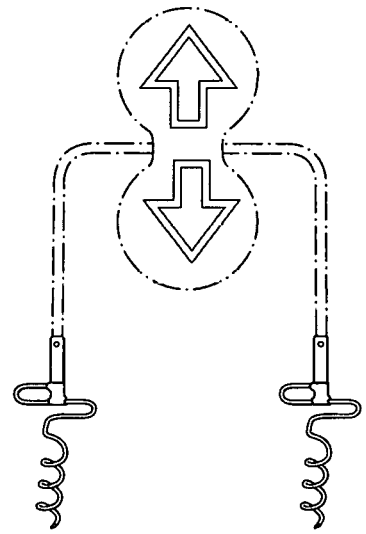
FIG. 17 is a perspective view of the rotary support stand of FIG. 16 shown supporting a target shown in broken lines.
Figure 18:
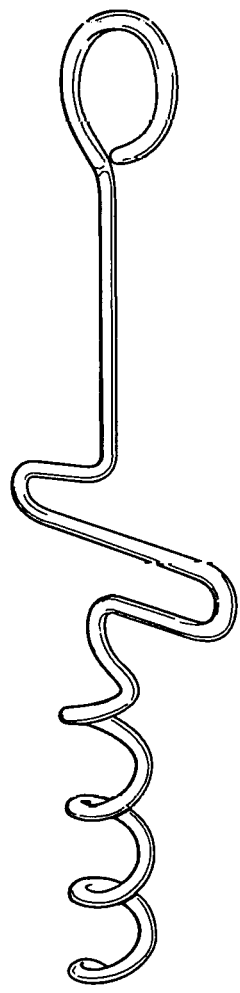
FIG. 18 is a perspective view of a rotary tie down.
Figure 19:
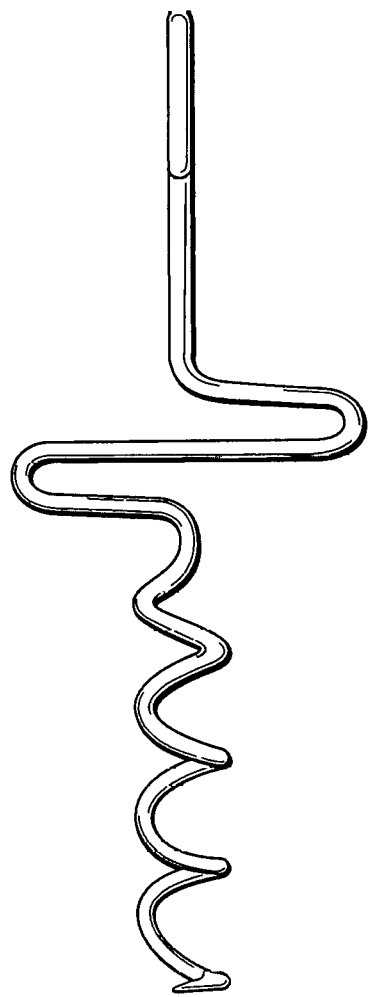
FIG. 19 is a side view of the rotary tie down of FIG. 18.
Figure 21:
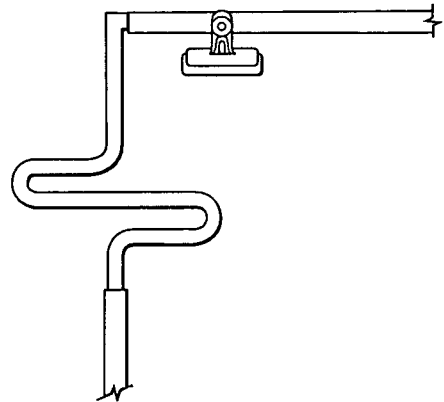
FIG. 21 shows an enlarged perspective view of a top portion of the rotary auger sign support of FIG. 20.
Figure 20:
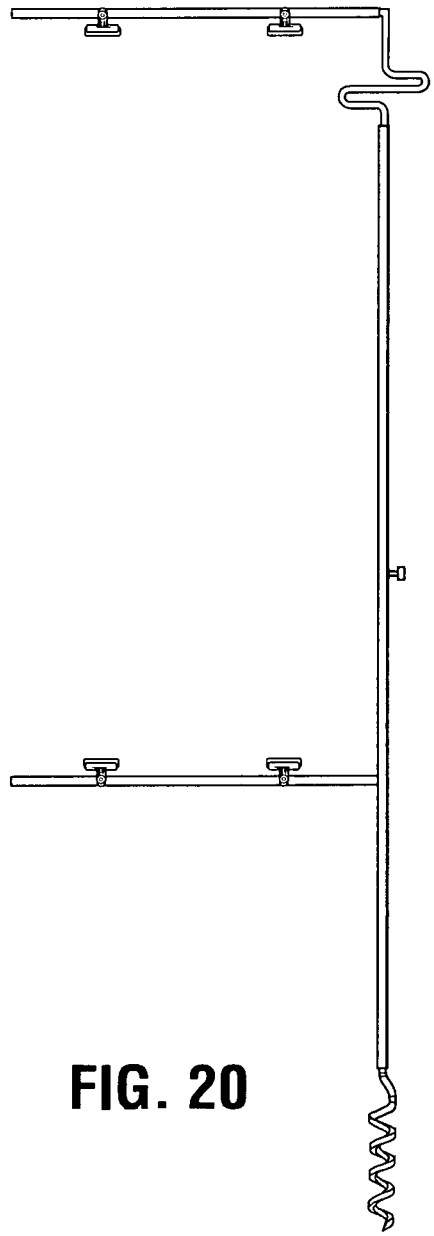
FIG. 20 shows a front view of a rotary auger sign support.

As shown in the embodiment in FIGS. 17-18, the auger includes a main body portion helixes is comprised of bar stock having a square cross sectional area. The corner edges of the square bar stock form cutting edges when the stock is bent or formed into a helix. One preferred embodiment of the instant invention includes a main body portion having three full helixes and a tip portion comprising a half helix. The neck of the rotary auger support is angled inwardly toward the center of the main body portion in order to center the shaft top portion with respect to the main body portion. The neck portion includes a helix first segment, a short straight inward angled second segment, a straight angled third segment, and a short straight outward angled fourth segment, connecting to a vertical straight top segment of a desired length.

The rotary auger having a bottom portion for insertion into the ground comprises a helical coil having a cutting edge which functions as a plurality of flights forming an auger having cutting edges with a wedge point at the lower distal end to be fixedly and removably screwed into the ground to support the rotary auger support in an upright position.

The angle of the twists forming the flights of the helix of the main body portion are angled forming a plane. The cutting edges of the helix enable the auger to cut through soil and debris for ease of rotation and deep ground penetration which includes the desirable features of helix flights. Moreover, the auger of the present invention is an improvement over the flights of conventional augers in that the narrow diameter of the stock and diameter of the flights enables the auger to cut and drill through small openings in rocky soil and wedge between rocks. Moreover, the rotary auger support 10 of the present invention can be rotatably inserted into hard clay which would resist penetration by an auger having flights or a helix auger comprising round stock.

In accordance with the present invention, there is provided a rotary auger tie down stand 10 which holds a tie down in position above the ground for the intended user. The integral handle tie down rest is located at an upper end of a shaft extending upwardly from a spiral auger wherein the handle tie down rest can be bent at a selected angle to hold the tie down in a selected position with respect to the surface of the ground.

The rotary auger tie down mounting stand 10 provides a portable outdoor rest for removably holding a tie down upright on the ground. The stand includes an above ground upright rod or shaft 12 having a bottom portion for insertion into the ground comprising a helical coil 16 or plurality of flights forming an auger 14 having a point 18 at the lower distal end to be fixedly and removably screwed into the ground 20 to support the stand 10 in an upright position. The top end of the rod 12 forming the stand body defines an S-shaped loop and tie down rest 22 configured, sized and shaped and disposed at a selected angle ranging from 0 to 180 degrees from a vertical position to support an arm 30 of a tie down 32 holding the tie down in a substantially vertical position above the ground. The integral loop rest 22 which supports the is tie down serves as a handle for the purpose of rotating the auger into the ground.

The integral crank handle rest 22 supports an arm of a tie down substantially vertically with respect to the ground. As shown in FIG. 7, a compound tie down is removably held in position whereby the weight of the tie down is supported by an S-shaped loop. The handle rest loop 22 includes a first portion 40 which extends outwardly from the rod 12 at a selected angle which is shown in the Figures to be a right angle or 90 degree angle. A second portion 42 extends upwardly over, spaced apart from and in alignment with the first portion forming a curved or bent portion 41 and extends past the shaft 12 a selected equal distance from the shaft 12. A third top portion 44 extends upwardly over, spaced apart from and in alignment with the second portion forming a curved or bent portion 43 and extends to the shaft 12. It is contemplated that one or more additional loops such as a second loop 50 could be added to the first loop 22 to provide means for holding an additional tie down. Moreover, the additional loop 50 could be spaced apart a selected wider or more narrower distance than the first loop 22 in order to provide variable means for holding an arm of a tie down at a selected angle with respect to the ground as shown best in FIG. 4.

A sound dampening sleeve 46 composed of a fabric, polymer, rubber, or elastomer to cover a selected portion of the tie down handle rest 22, 44. Moreover, the sleeve may be comprised of a plurality of bands 49 such as rubber bands, tape, tube, hose or combinations thereof which to enhance the frictional engagement of the tie down arm against the other material by reducing slippage.

Lawn Stake for Supporting Decorative Elements

In accordance with the present invention, there is provided a lawn stake 10 comprising a vertical shaft 11 with a helical coil 18 at the bottom end, an S-shaped rotary handle 16 extending vertically upward from the upper end of the helical coil 18, and a receiver extending upward from the top end of the S-shaped rotary handle for holding a decorative fixture such as a light 12, as shown in FIGS. 1-3 and 9.

Figure 3:
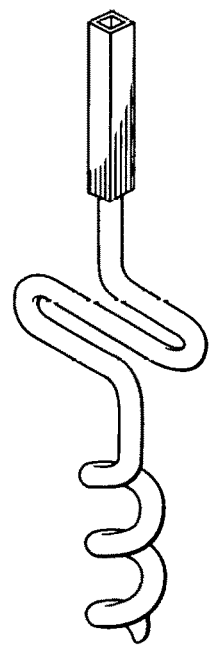
FIG. 3 is a perspective view of a rotary auger support stand having a rectangular, or square tubular adapter extending from the top for cooperative engagement with a corresponding tube or bar stock shaft of an article to be supported thereon with a cylindrical auger portion.
Figure 4:
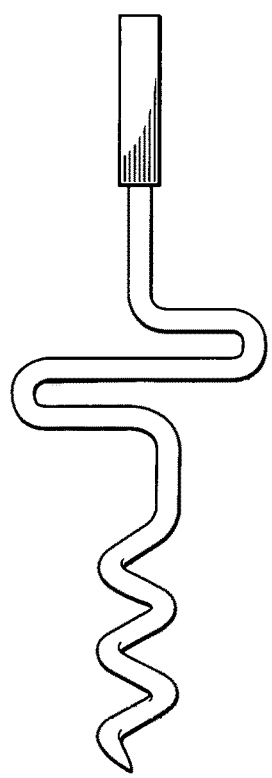
FIG. 4 is a front view of the rotary auger support stand shown in FIG. 3.
Figure 9:
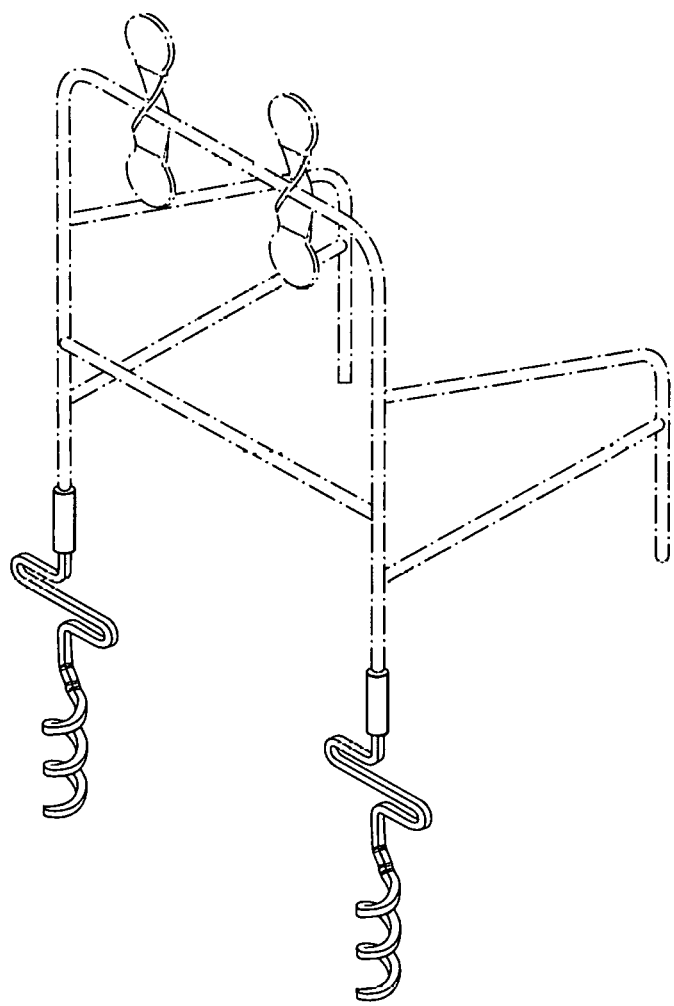
FIG. 9 is a perspective view showing a pair of rotary auger support stand supporting a target shown in broken lines.
Figure 10:
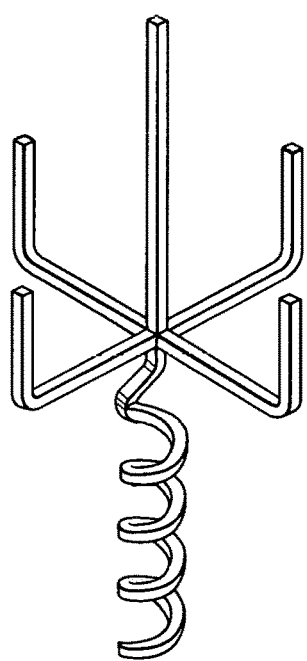
FIG. 10 is a perspective view showing a rotary support stand having a square auger extending from a straight longitudinal shaft with a base consisting of a pair of cross members extending normal to the shaft for setting flat on the surface with the cross members having up turned distal ends forming handles.
Figure 11:
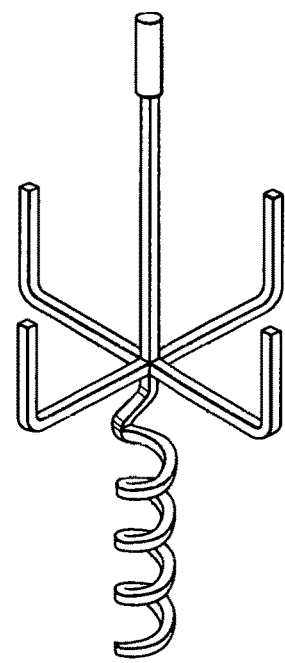
FIG. 11 is a perspective view of the rotary support stand of FIG. 10 showing a cylindrical adapter disposed on the upper distal end of the shaft.
Figure 12:
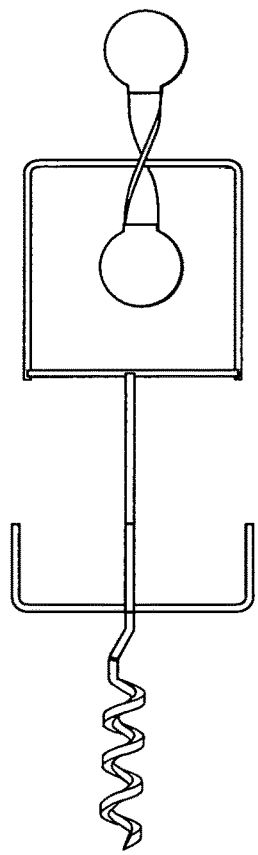
FIG. 12 is a perspective view of the rotary support stand of FIG. 10 showing a cylindrical adapter disposed on the upper distal end of the shaft cooperatively engaging the shaft of a target supported thereby shown in broken lines.
Figure 13:
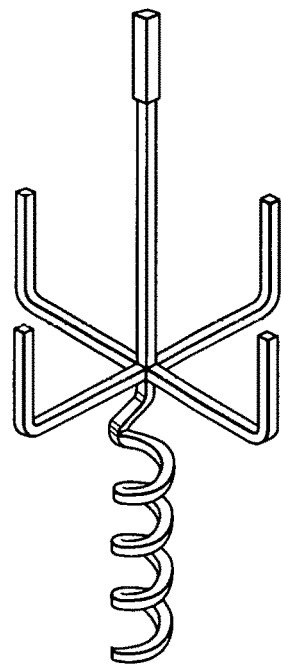
FIG. 13 is a perspective view of the rotary support stand of FIG. 10 showing a square or rectangular adapter disposed on the upper distal end of the shaft.
Figure 14:
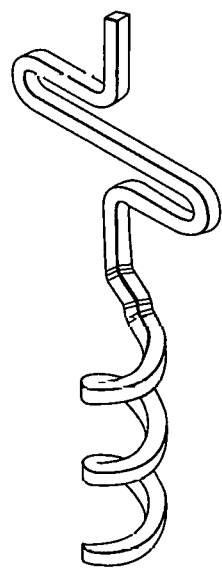
FIG. 14 is a perspective view of the rotary support stand showing the auger, "S" shaped handle and upper shaft comprising square stock.
Figure 16:
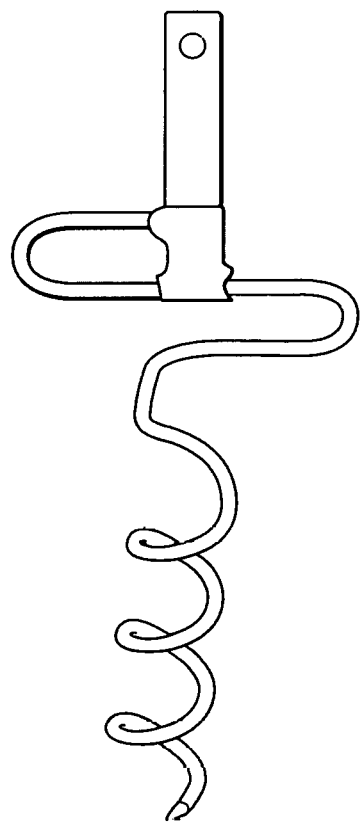
FIG. 16 is a perspective view of a rotary support stand.
Figure 15:
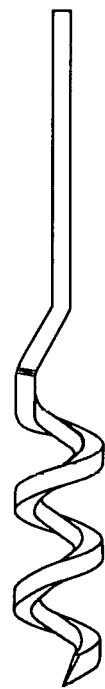
FIG. 15 is a perspective side view of the rotary support stand of FIG. 14 showing the inner bend diameter of ⅜ inch bar stock, a helical pitch of 2.0 at (1) of 3.5 revolutions and a variable pitch of 3.0 for 0.25 revolutions shown at (3), a pitch diameter of 1.375 inches, having a helical pitch of 2.0 (2)

The receiver 27, in FIG. 9 is a lug fixedly attached above the S-shaped handle 16. A lighting fixture or other decorative fixture is fixedly attached to the lug 27 by welding or with fasteners such as screws and nuts inserted into apertures provided in the lug and the bottom of the decorative fixture to be added to the lawn stake. One preferred embodiment includes a tubular receiver 17 with a thumbscrew 24 as shown in FIGS. 3 and 4. A fixture 15 which would be suitable for attachment to such a lawn stake is shown in FIG. 10 and includes a body 52 with a downward extending lug 50 which is sized and shaped to be inserted into the upper aperture 28 and to fit snugly into the tubular receiver 17. The thumbscrew 24 is then tightened to lock the fixture in place.

The tubular receiver 17 with aperture 28 and the lug 50 are preferably square but can be circular as shown in FIG. 7 or any other shape which provides for easy and secure holding of the decorative fixture within the lawn stake.

Figure 1:
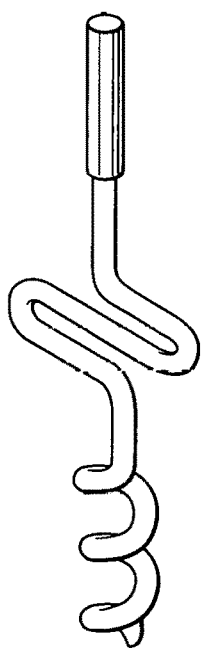
FIG. 1 is a perspective view of a rotary auger support stand having a cylindrical tubular adapter extending from the top for cooperative engagement with a corresponding tube or bar stock shaft of an article to be supported thereon with a cylindrical auger portion.
Figure 2:
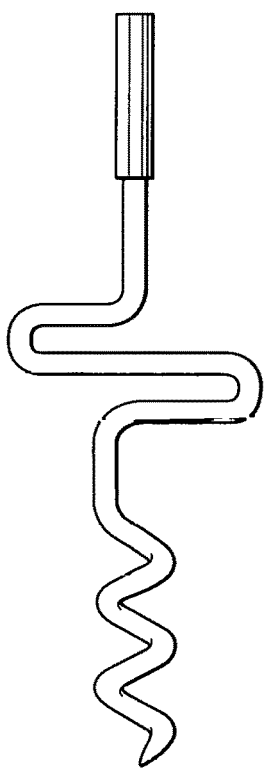
FIG. 2 is a front view of the rotary auger support stand shown in FIG. 1.

The lawn stake 10 in FIG. 1 has a battery operated light fixture attached at the upper end whereas the lawn stake 10 in FIG. 2 has a light fixture with power cord attached at it's upper end. The battery operated light fixture of FIG. 3 includes a solar charger 22 to charge the batteries.

FIGS. 1 and 2 show a lawn stake 10 with a simple S-shaped rotary handle with no reinforcement. However, one preferred embodiment, the lawn stake 31 in FIGS. 3 and 4 has a reinforced S-shaped handle 16. At the upper end of the stake is a receiver tube 17 which is connected to the top end of the S-handle 16 and again at the middle of the S-handle. This double attachment of the receiver tube 17 to the S-handle reinforces the handle against bending or twisting and gives stronger support of the decorative element which is mounted in the receiver tube. As shown in FIGS. 3 and 4, the receiver tube includes a thumb screw 24 for clamping the downward extending shaft of the decorative element firmly in the tube.

Figure 5:
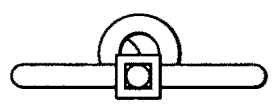
FIG. 5 is a top view of the rotary auger support stand shown in FIG. 3.

The lawn stake 35 in FIGS. 5 and 6 includes vertical shaft 11 with helical coil 18 extending downward therefrom at the bottom end and an S-shaped rotary handle 16 extending vertically upward from above the helical coil 18. The lawn stake in FIG. 5 includes a receiver 27 extending upward from the top end of the S-shaped rotary handle 16 for attaching the shepherds hook 34 above the S-shaped rotary handle 16. As can be seen in the figures, the lawn stake can include extended straight sections 11 and 58 to provide for higher vertical support as in FIGS. 5 and 6. Other lawn stakes are shorter to support a fixture just above the ground such as the light fixtures of FIGS. 1-3.

Decoy Support

In accordance with the present invention, there is provided a decoy/camera stake comprising, consisting of, or consisting essentially of an elongated rod having a helical coil formed at a bottom end thereof and an integral S-shaped crank handle formed therein above the helical coil. The rod is adjustable in length and male threads at a top end thereof. The threads have a diameter of one quarter inch and a pitch of 20 threads per inch. When compared to a stake with one or more spikes to be driven into the ground for support, a helical coil is a superior form of attachment to the ground for a decoy stake. A stake screwed into soil provides a more stable anchor than a straight shaft of the same length engaging the ground. Moreover, the area around a duck blind used by hunters is likely to be swampy or in a shallow lake or pond where the ground is muddy and soft. Sticking a spike into mud does not provide as secure support as a connection made by screwing in a helical coil, even in the mud. It is an object of this invention to provide a duck decoy stake which includes a helical coil at one end which can be screwed into the ground. It is an object of this invention to provide a duck decoy stake which includes a integral crank handle for the purpose of screwing the stake into the ground. It is an object of this invention to provide a duck decoy stake with helical coiled threads at one end and an opposite end which is square for receiving a duck decoy. It is an object of this invention to provide a duck decoy stake with a helical coil at one end and a crank handle which can be used to thread the coil into the ground, thus forming a rigid connection with the ground and providing secure support for a decoy. It is an object of this invention to provide a duck decoy stake which also includes a loop for attaching a jerk line to the upper end of the decoy stake. It is an object of this invention to provide a duck decoy stake or pole with ¼ inch by 20 threads at the top end for holding a standard camera. It is an object of this invention to provide a duck decoy stake or pole with a receiver at the top end for holding a standard camera wherein the receiver includes rod portion with ¼ inch by 20 threads and the rod portion is adjustably attached to the top end of the stake so that the camera may be held at any desired angle.

In accordance with the present invention, there is provided a device comprising, consisting of, or consisting essentially of an elongated rod having a helical coil formed at a first end thereof and a lug at the second end thereof. The lug is capable of cooperatively engaging a lug receiver in a turkey decoy. The rod has a U-shaped handle formed therein within about five inches of the lug. The U shaped handle is formed by bending the rod at a right angle and then, at a location about three inches from the right angle bend, bending the rod one hundred eighty degrees back onto itself, thus forming a U-shape, and then bending the rod at a right angle so that the axis of the rod above the U-shape and the axis of the rod below the U-shape are coaxial.

Moreover, there is provided a device comprising, consisting of, or consisting essentially of an elongated rod having a helical coil formed at a bottom end thereof and an end cap at a top distal end thereof. The rod includes a crank handle formed therein by formation of a "U-shaped handle" near the top end of the decoy stake providing for a holding means to rotate the rod. The top end of the rod includes at least one transverse aperture formed therein about one inch below the top end of the stake and a second transverse aperture formed therein about two inches below the top end, a second transverse aperture contains a ring which is capable of holding a jerk line. It is contemplated that a plurality of transverse apertures can be drilled or formed within the stake to provide adjustable attachment of the decoy which are generally mounted onto a base comprising a round aperture member which fits in cooperative relationship with the top end cap of the rod. When compared to a stake with one or two spikes, a helical coil is a superior form of attachment to the ground for a decoy stake. A stake screwed into soil is more secure than a straight rod, particularly when a user is trying to fix a decoy stake to soil which may be muddy and soft. Sticking a spike into mud is not as secure as a connection made by screwing in a helical coil, even in the mud.

It is an object of this invention to provide a turkey decoy stake which includes a helical coil at one end which can be screwed into the ground. It is an object of this invention to provide a turkey decoy stake which includes a U-shaped integral handle for the purpose of screwing the stake into the ground. It is an object of this invention to provide a turkey decoy stake with helical coiled threads at one end and a lug at the opposite end for receiving a turkey decoy. It is an object of this invention to provide a turkey decoy stake with a helical coil at one end and an integral handle which can be used to thread the coil into the ground, thus forming a rigid connection with the ground and providing secure support for a decoy.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplification presented herein above. Rather, what is intended to be covered is within the spirit and scope of the appended claims.

I claim:

1. A rotary auger support stand comprising:
   a bottom section extending from a bottom distal end of said medial section, said bottom section comprising a helical spiral coil having a constant radius and extending downward therefrom a selected distance including a tapered point for penetration into the ground;
   a medial section extending upward from said bottom section comprising a vertical rod;
   a handle section extending from said medial section comprising a curved rod forming at least one "S" shaped loop comprising a first horizontal segment extending outwardly from said medial section at a generally 90 degree angle a selected first length and having a proximate end portion curving upward forming a first 180 degree curved loop extending upward and over said first horizontal segment and past said medical section a selected second length defining a second horizontal section spaced apart from and in alignment with said first horizontal section, said second horizontal segment forming a second 180 degree curved loop extending upward and over a portion of said second horizontal segment forming a third horizontal segment extending to said medial section spaced apart and in alignment with said second horizontal segment, said third horizontal segment forming a generally 90 degree angle extending upward forming a top section;
   and said top section comprising a rod in vertical alignment with said medial section for supporting an article thereon.

2. The rotary auger support stand of claim 1, wherein said medial section, said top section, said handle section, and said bottom section are integrally formed from a single elongated rod.

3. The rotary auger support stand of claim 1, wherein said handle includes at least one sleeve composed of material selected from the group consisting of a fabric, a polymer, a rubber, an elastomer, and combinations thereof for covering a selected portion of said handle.

4. The rotary auger support stand of claim 1, wherein said handle includes an additional loop.

5. A rotary auger support stand comprising:
   a medial portion comprising an elongated rod;
   a bottom portion comprising a helical spiral coil having a point extending downward from said elongated rod for a selected distance for penetration into the ground;
   and a top portion defining a handle comprising at least one curved "S" shaped loop portion including a first straight section extending outwardly from said elongated rod at a selected angle from said top distal end of said elongated rod, a first curved end section extending from a distal end of said first straight section returning 180 degrees extending inwardly toward said elongated rod forming a second straight section spaced apart, parallel, and in alignment with said first straight section extending past said elongated rod, and a second opposing curved end section returning 180 degrees extending inwardly forming a third straight section extending from said second opposing curved end section spaced apart, parallel, and in alignment with said first straight section and said second straight section.

6. The rotary auger support stand of claim 5, wherein said additional loop is spaced apart from said at least two opposing looped sections at a selected width forming a wider or narrower loop.

7. The rotary auger support stand of claim 6, wherein said handle supporting section includes a closed loop extending from an elongated vertical rod projecting upward from said handle.

8. The rotary auger support stand of claim 5, wherein said medial section, said handle, and said bottom section are integrally formed from a single elongated rod.

9. The rotary auger support of claim 1, wherein said distal end of said top section comprises a partially closed loop extending therefrom.

10. The rotary auger support of claim 1, wherein said distal end of said top section comprises a closed loop extending therefrom.

11. The rotary auger support of claim 1, wherein said distal end of said top section includes a sleeve.

12. The rotary auger support of claim 1, wherein said generally 90 degree angle forms a curved portion.

13. The rotary auger support of claim 1, wherein said bottom section comprises an auger including a plurality of helixes.

14. The rotary auger support of claim 1, wherein said bottom section comprises an auger including three full helixes and a tip portion comprising a half helix.

15. The rotary auger support of claim 1, wherein said bottom section comprises an auger having a neck angled inwardly toward the center of said main body portion in order to center said bottom section with respect to said medial section and said top section.

16. The rotary auger support of claim 1, wherein said bottom section comprises an auger including a neck portion having a helix first segment, a short straight inward angled second segment, a straight angled third segment, and a short straight outward angled fourth segment connecting to said medial section of a desired length.

17. The rotary auger support of claim 1, wherein said bottom section comprises an auger comprised of bar stock having a square cross sectional area whereby a plurality of corner edges of said square bar stock form cutting edges extending along said helix.

18. The rotary auger support stand of claim 1, wherein said medial section, said handle, said top section, and said bottom section are formed into a integral elongated rod by welding.

19. A rotary auger support stand comprising:
a bottom section extending from a bottom distal end of said medial section, said bottom section comprising a helical spiral coil having a constant radius extending downward therefrom a selected distance including a tapered point for penetration into the ground, said bottom section having a neck angled inwardly toward the center of said main body portion in order to center said bottom section, and said helix comprises bar stock having a square cross sectional area whereby a plurality of corner edges of said square bar stock form cutting edges extending along said helix;
a medial section extending upward from said bottom section comprising a generally vertical rod;
a handle section extending from said medial section comprising a curved rod forming at least one "S" shaped loop comprising a first horizontal segment extending outwardly from said medial section at a generally 90 degree curve a selected first length and having a proximate end portion curving upward forming a first 180 degree curved loop extending upward and over said first horizontal segment and past said medial section a selected second length defining a second horizontal section spaced apart from and in alignment with said first horizontal section, said second horizontal segment forming a second 180 degree curved loop extending upward and over a portion of said second horizontal segment forming a third horizontal segment extending to said medial section spaced apart and in alignment with said second horizontal segment, said third horizontal segment forming a generally 90 degree curve extending upward forming a top section;
and said top section comprising a rod in vertical alignment with said medial section for supporting an article thereon.

20. The rotary auger support of claim 1, wherein said distal end of said top section is selected from the group consisting of a cap, a cylindrical sleeve, a square sleeve, a longitudinal extension having a means for mounting an object thereon, a cylindrical lug, a square lug, a threaded lug, a lug of a selected shape for supporting an object thereon, and a sleeve of a selected shape for supporting an object thereon.

21. The rotary auger support stand of claim 5, wherein said handle includes an additional loop.

22. The rotary auger support of claim 5, including a top section comprising a rod in vertical alignment with said medial section for supporting an article thereon.

23. The rotary auger support of claim 22 wherein said distal end of said top section is selected from the group consisting of a cap, a cylindrical sleeve, a square sleeve, a cylindrical lug, a closed loop, a partially closed loop, a square lug, a threaded lug, a longitudinal extension having a means for mounting an object thereon, a lug of a selected shape for supporting an object thereon, and a sleeve of a selected shape for supporting an object thereon.

24. The rotary auger support of claim 5, wherein said generally 90 degree angle forms a curved portion.

25. The rotary auger support of claim 5, wherein said bottom section comprises an auger including a plurality of helixes.

26. The rotary auger support of claim 5, wherein said bottom section comprises an auger including three full helixes and a tip portion comprising a half helix.

27. The rotary auger support of claim 5, wherein said bottom section comprises an auger having a neck angled inwardly toward the center of said main body portion in order to center said bottom section with respect to said medial section and said top section.

28. The rotary auger support of claim 5, wherein said bottom section comprises an auger including a neck portion having a helix first segment, a short straight inward angled second segment, a straight angled third segment, and a short straight outward angled fourth segment connecting to said medial section of a desired length.

29. The rotary auger support of claim 5, wherein said bottom section comprises an auger comprised of bar stock having a square cross sectional area whereby a plurality of corner edges of said square bar stock form cutting edges extending along said helix.

30. The rotary auger support of claim 19 wherein said distal end of said top section is selected from the group consisting of a cap, a cylindrical sleeve, a square sleeve, a cylindrical lug, a closed loop, a partially closed loop, a square lug, a threaded lug, a longitudinal extension having a means for mounting an object thereon, a lug of a selected shape for supporting an object thereon, and a sleeve of a selected shape for supporting an object thereon.

31. The rotary auger support of claim 19 wherein said generally 90 degree angle forms a curved portion.

32. The rotary auger support of claim 19, wherein said bottom section comprises an auger including three full helixes and a tip portion comprising a half helix.

33. The rotary auger support of claim 19, wherein said bottom section comprises an auger including a neck portion having a helix first segment, a short straight inward angled second segment, a straight angled third segment, and a short straight outward angled fourth segment connecting to said medial section of a desired length.

* * * * *